United States Patent [19]

Lam

[11] Patent Number: 5,560,109

[45] Date of Patent: Oct. 1, 1996

[54] SKIMMING SPOON

[76] Inventor: Ching-Keung Lam, Flat B-6, 4/F, Eastern Block, Pearl Island Villas, Pearl Island, Castle Peak, New Territories, Hong Kong

[21] Appl. No.: 343,365

[22] Filed: Nov. 22, 1994

Related U.S. Application Data

[63] Continuation-in-part of Ser. No. 161,148, Dec. 2, 1993, abandoned.

[51] Int. Cl.[6] ................................................. A47J 43/28
[52] U.S. Cl. ........................................... 30/325; 30/324
[58] Field of Search ............................ 210/256, 305, 210/306, 522; 30/324–326

[56] References Cited

U.S. PATENT DOCUMENTS

| | | | |
|---|---|---|---|
| 3,339,743 | 9/1967 | Bealle | 210/256 |
| 4,040,185 | 8/1977 | Jacobi | 30/326 |
| 4,825,551 | 5/1989 | Sherblom | 30/325 X |
| 4,983,295 | 1/1941 | Lamb et al. | 210/522 X |
| 5,084,177 | 1/1992 | Keene | 30/325 |
| 5,372,718 | 12/1994 | Zebian | 210/305 X |

*Primary Examiner*—Douglas D. Watts
*Attorney, Agent, or Firm*—Wolf, Greenfield & Sacks, P.C.

[57] ABSTRACT

A kitchen utensil is described in the form of a spoon for separating a liquid from an unwanted floating component. The spoon has a handle and a ladle and 2 comprising two liquid receiving vessels 3, 4. One of the vessels 3 is received within the other 4 and is formed with a hole 5 at the base thereof. In use liquid in the first vessel 3 flows through the hole 5 into the second vessel 4, from whence it may be poured, leaving the unwanted component in the first vessel 3.

20 Claims, 4 Drawing Sheets

SKIMMING SPOON

This application is a continuation-in-part of Ser. No. 08/161,148 filed 2 Dec. 1993, now abandoned.

FIELD OF THE INVENTION

This invention relates to a kitchen utensil, and in particular to such a utensil adapted to enable a liquid to be separated from a floating component, for example for separating meat stock from any fat that may be floating on the surface.

BACKGROUND OF THE INVENTION

It is a common requirement when cooking or preparing foods that the cook may need to separate from a liquid a component that floats on the surface of the liquid. Typical examples of this, include separating fat from a liquid, separating two different components of a liquid of different specific gravities, or separating a liquid from solid objects floating thereon. Several different devices have been known over the years for achieving this object. One known device, for example, is a spoon having a pouring outlet. Across the face of this outlet is provided a plate in the form of a baffle, a small space being defined between the base of this plate and the trough leading to the pouring outlet. Such a traditional spoon is reasonably effective, providing there i a large quantity of liquid in the spoon. As the level of liquid approaches the position at which the hole is provided however, the spoon begins to lose its effectiveness. Also, as the spoon is tilted to pour liquid unwanted material floating on the top of the liquid can sometimes pass over the top of the baffle plate.

OBJECT OF THE INVENTION

It is an object of this invention to provide a kitchen utensil which can easily and reliably separate a liquid from a component floating on the top of the liquid, while reducing the chances of the unwanted component accidentally being included in the liquid. The utensil should be easy and simple to use and reliable in its operation.

SUMMARY OF THE INVENTION

In accordance with the invention there is provided apparatus for separating a liquid from a floating component, comprising first and second liquid receiving vessels, said first liquid receiving vessel being received within said second liquid receiving vessel, said first liquid receiving vessel having a hole at a base region thereof through which liquid received in said first liquid receiving vessel in use may flow into said second liquid receiving vessel from which said liquid may then be poured.

With such apparatus liquid is drawn from the base of the mixture of the liquid and the unwanted component and passes into the second vessel from which it is poured. Such liquid will be pure liquid and the unwanted component will remain in the first vessel. The apparatus is preferably in the form of a spoon, but could also be in the form of a cup, jug, glass or the like.

Preferably the first liquid receiving vessel is mounted for rotation relative to the second liquid receiving vessel, whereby when the second vessel is tilted to pour liquid therefrom, the first vessel remains horizontal and liquid in the first vessel does not escape into the second vessel other than by means of the hole.

Preferably the two vessels are at least approximately hemispherical and are mounted for relative rotation about a common axis extending across the open face of the two vessels. To facilitate pouring of the liquid from the second vessel, the second vessel may be provided with a pouring opening and a trough leading thereto from a location beneath the hole in the first vessel. Preferably also, sealing means are provided around the open edges of the two vessels in order to reduce the possibility of the first vessel overflowing and spilling the unwanted component into the second vessel.

If desired, the hole may also be provided with filter means, for example a fine mesh, to further reduce a possibility of the unwanted component passing from the first vessel to the second.

BRIEF DESCRIPTION OF THE DRAWINGS

FIG. 8b is a cross-sectional view of the filter plate of FIG. 8a.

DETAILED DESCRIPTION OF PREFERRED EMBODIMENT

Figure 1:
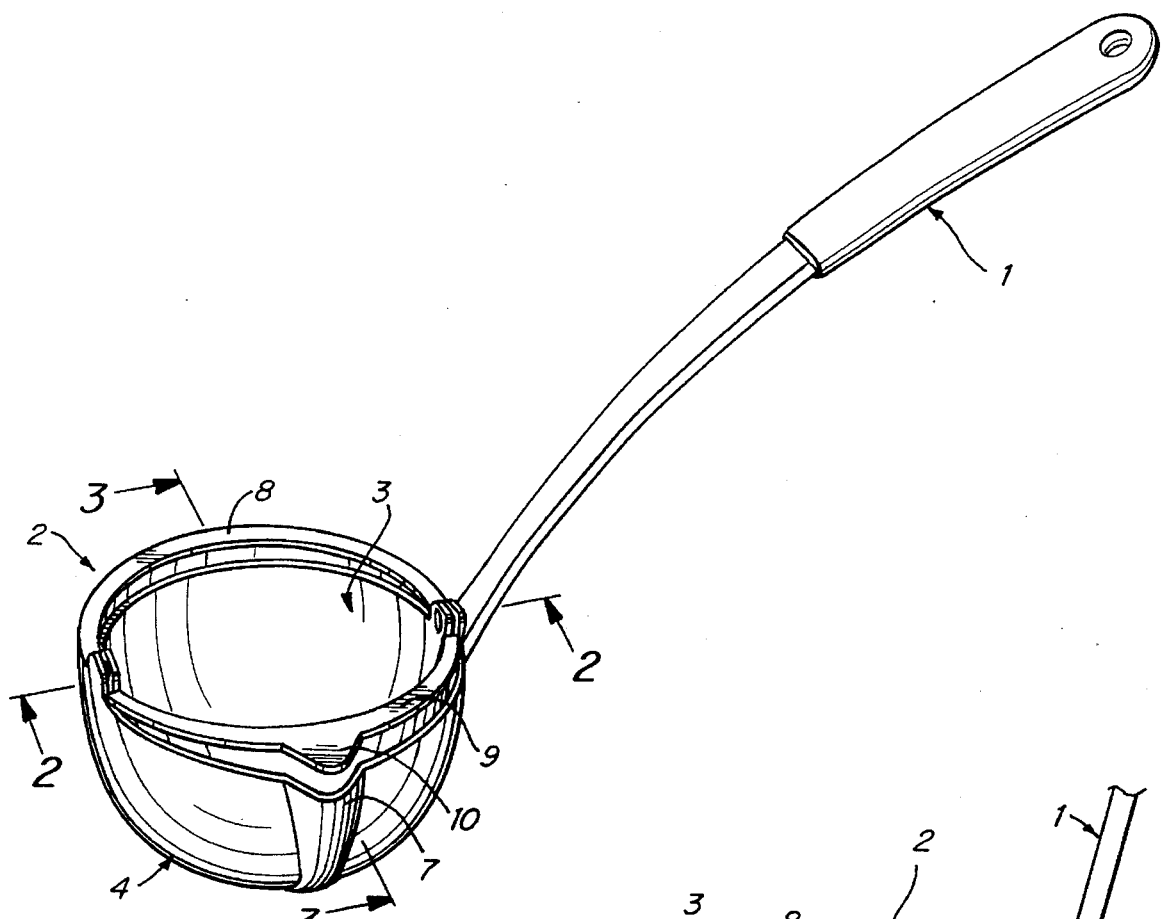
FIG. 1 is a perspective view of one embodiment of the invention.

Referring firstly to FIG. 1 there is shown a kitchen utensil in the form of a spoon comprising a handle 1 and a liquid receiving portion 2. The liquid receiving portion 2 comprises hemispherical first and second liquid receiving vessels 3, 4. The first liquid receiving vessel 3 is slightly smaller in dimensions than the second vessel 4 and is received therein. The first vessel 3 is mounted for rotation relative to the second vessel 4 in the manner of a gimbal mounting along a common axis extending across the open faces of the two vessels.

Figure 2:
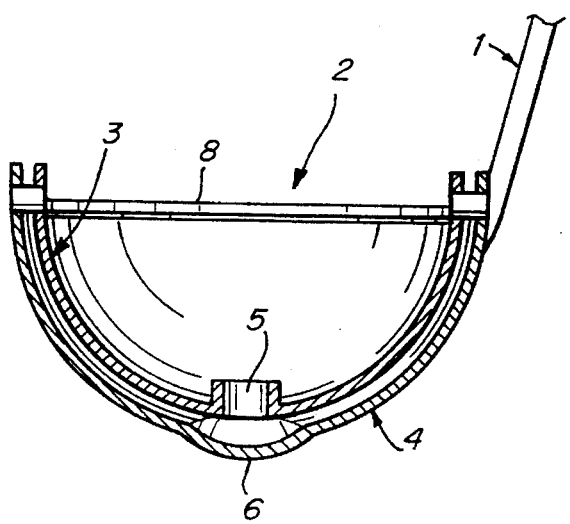
FIG. 2 is a sectional view through the line AA in FIG. 1.
Figure 3:
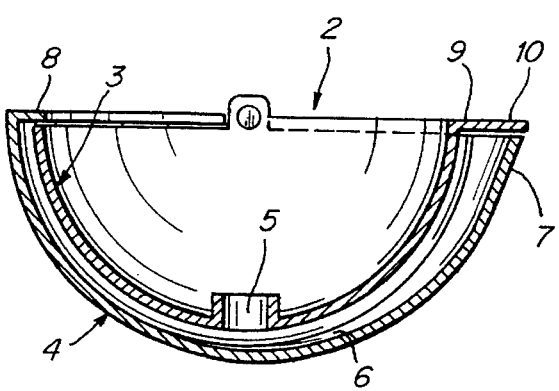
FIG. 3 is a sectional view through the line BB in FIG. 1.

At the lowest point of the first liquid receiving vessel 3, as shown in FIGS. 2 and 3, there is a hole 5. Beneath this hole 5, the second liquid receiving vessel 4 is provided with a trough portion 6 that extends to a pouring portion 7 defined in the external surface of the second liquid receiving portion 4.

The rear half of the second liquid receiving portion 4 is provided with an inwardly directed rib 8 which when the two liquid receiving portions are not relatively rotated, ie with the first receiving portion being completed received within the second, forms a seal to prevent liquid overflowing the rear edge of the first receiving portion and spilling into the second liquid receiving portion. Similarly, the front edge of the first liquid receiving portion is provided with an outwardly extending flange 9 that engages the upper edge of the front of the second liquid receiving portion 4 so as to define a seal at the front edge. This outwardly extending flange includes a projection 10 to extend over the pouring opening 7 of the second liquid receiving portion 4. Thus when the first liquid receiving portion 3 is fully received within the second liquid receiving portion 4 there is a seal defined around the circumference of the spoon whereby when the spoon is being used to ladle liquid into the first liquid receiving vessel liquid does not flow over into the second liquid receiving vessel.

Operation of the spoon will now be described. The liquid with its unwanted component is either spooned or poured into the first liquid receiving vessel 3. The unwanted component floats on the surface of the liquid while the desired liquid escapes from the first vessel 3 into the second liquid receiving vessel 4 through the hole 5 in the bottom of the first vessel. If the spoon is then tilted so as to cause relative movement of the first and second liquid receiving vessels, the seal at the front of the spoon is opened and liquid can be poured from the second liquid receiving vessel through the trough 6 to the pouring offing 7 formed in the second loquid receiving vessed. In addition, because of the relative rotation, the first liquid receiving vessel remains horizontal and therefore the undesired component does not overflow the first vessel into the second. When the pouring action ceases, the tilt of the spoon is stopped and the two vessels once again both take up horizontal positions and the seal between them is reformed.

The rotational mounting of the first liquid receiving vessel within the second may be achieved by any desirable means, but preferably the first vessel may be removably mounted from the second in order to facilitate cleaning of the spoon. Preferably also, the base region of the first liquid receiving vessel may be thickened relative to the remainder of the vessel in order to lower the center of gravity of the first liquid receiving vessel whereby it may remain more steady as the second vessel and the handle are tilted.

Figure 4A:
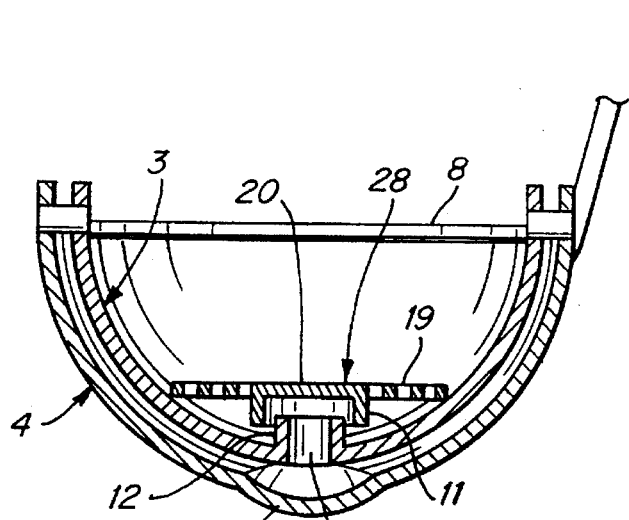
FIG. 4(a) and 4(b) are sectional and plan views of a second embodiment.
Figure 4B:
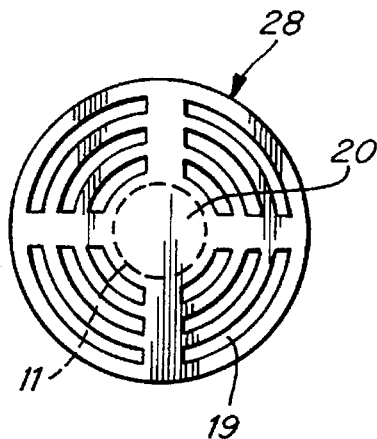

Turning now to FIGS. 4(a) and 4(b) there is shown an alternative embodiment in which the hole 5 in the base of the first vessel 3 is covered by a plate 28. The plate 28 is solid in a region overlying and extending radially of the hole 5 so as to prevent a direct flow of liquid to the hole 5. The remainder of the plate comprises an annular filter extending from the edge of the central solid zone 10 to the inner wall of the first vessel. Extending downwardly from the plate 28 at the junction between the filter 19 and the solid region 20, is an annular first wall 11. Extending upwardly from the edge of hole 5 is a second annular wall 12, disposed radially inwardly of the first wall. The first wall does not reach the base of the first vessel, and the second wall does not reach the plate. In use, liquid in the first vessel flows to the hole via the filter, which or course can act to filter out unwanted components from the liquid. After passing through the filter, the first and second walls act as baffles or obstructions to the flow of liquid and can trap further remaining unwanted components.

Figure 5A:
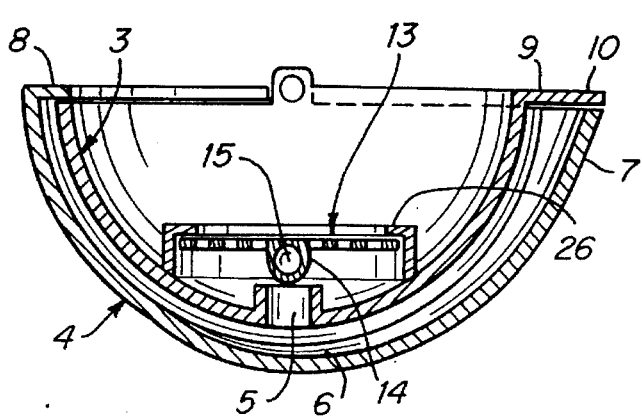
FIG. 5(a) and 5(b) are sectional and plan views of a third embodiment.
Figure 5B:
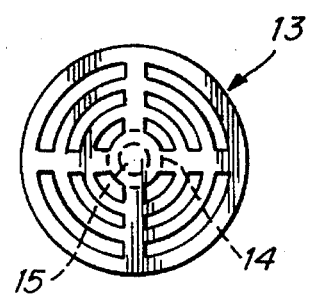

FIG. 5(a) and (b) illustrate a further embodiment in which a plate 13 is provided over the hole 5. In contrast with FIGS. 4(a) & (b), however, this plate 13 floats, a central downward projection 14 of the plate 13 being provided with an air or gas-filled buoyancy chamber 15. Upward movement of the plate 13 is limited by an annular rim 26. In normal use the plate floats above the hole 5 and liquid flows to the hole through the plate 13 which is constructed as a filter means. As the liquid level falls to the base of the first vessel, and accordingly the risk of an unwanted component passing through the hole increases, the plate 13 falls with the liquid until the projection 14 engages the hole 5 to block the hole.

Figure 6A:
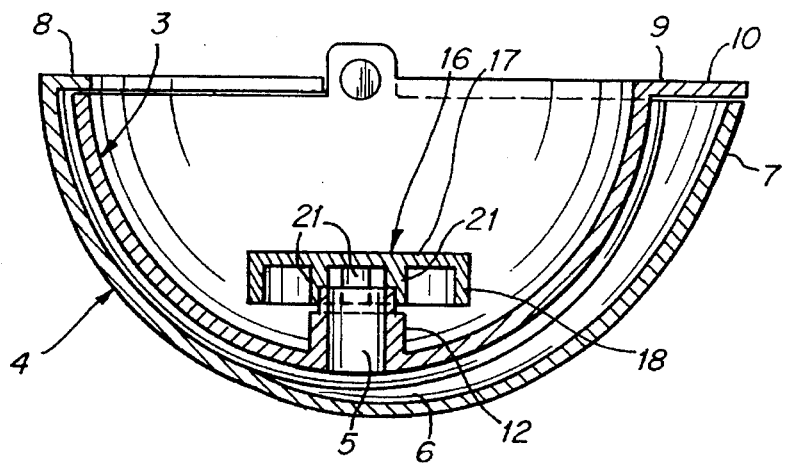
FIG. 6(a) and 6(b) are sectional and plan views of a fourth embodiment.
Figure 6B:
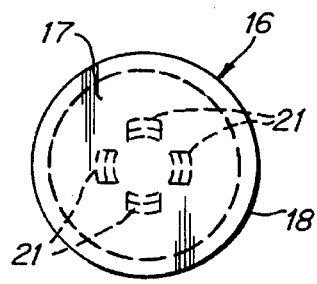
Figure 7:
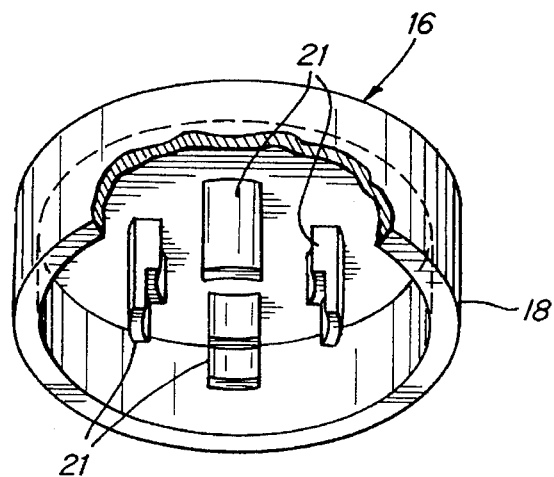
FIG. 7 is a perspective view of the fourth embodiment.

Turning now to FIGS. 6 & 7 there is shown a fourth embodiment in which the hole 5 is provided with an upstanding annular wall 12. Located in the hole 5 is a plug-like member 15 formed with downwardly extending fingers 16 for engaging the wall 12 of the hole 5. The upper surface 17 of the plug-like member 16 is solid and depending therefrom is an annular wall 18. The diameter of the upper surface 17 is such that wall 18 surrounds the wall 12 of hole 5, and the dimensions of the depending wall 18 are such that the wall 18 almost, but not quite, reaches the bottom of the first vessel. Instead a small gap is provided which allows liquid to pass therethrough, and thence through apertures between the fingers 21 to the hole 5. In use therefore liquid is constrained to flow to the hole 5 through the gap defined below depending wall 18 and apertures between the fingers. The depending wall 18 serves to block any unwanted component from entering the hole 5 until the liquid level falls below the bottom of the depending wall 18, at which point the spoon is effectively empty of liquid. The apertures between the fingers may also serve a filtering function, or themselves may be provided with filter means.

Figure 8:
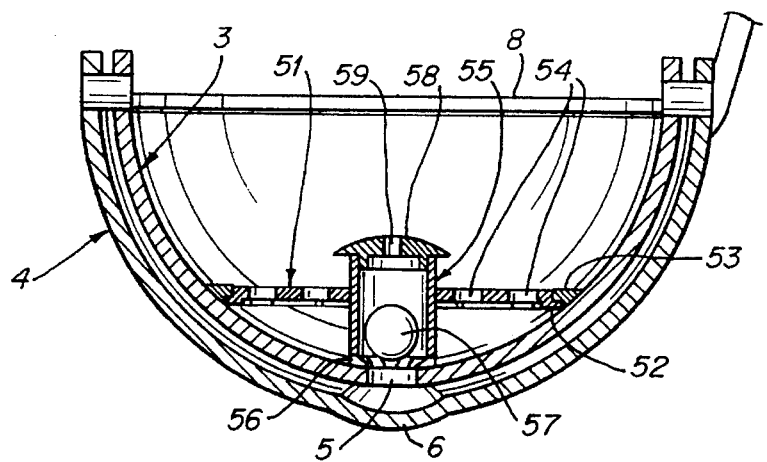
FIG. 8 is a cross-sectional view of the fifth embodiment.
Figure 8A:
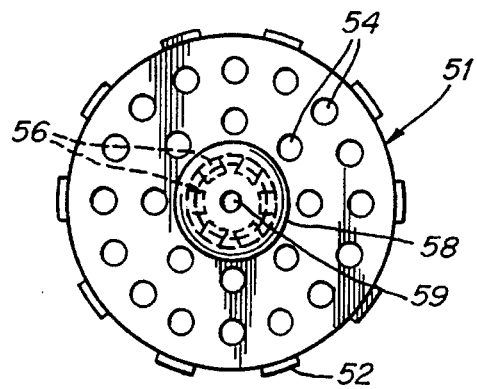
FIG. 8a is a plane view of the filter plate of the fifth embodiment.
Figure 8B:
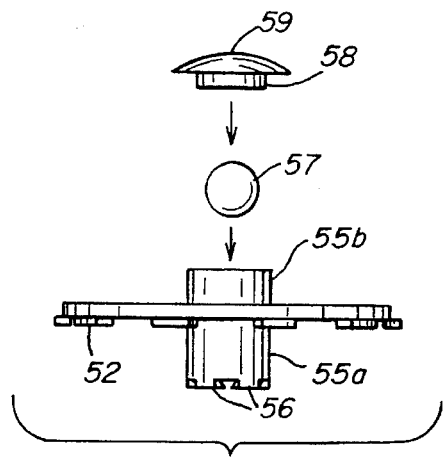

Referring now to FIG. 8, them is shown a fifth embodiment of the present invention in which a filter plate 51 partitioning the first liquid receiving vessel into two portions is removably secured thereto by means of a thin flange 52 formed on the perimeter of the plate 51 which can be snap-fitted with a circumferential rib 53 inside the first receiving vessel 3. To allow selective filtering of chunky or granular solid residues, there are provided a plurality of openings 54 on the surface of the plate 51. The region of the filter plate 51 overlying the hole 5 is removed and a guide wall 55 is formed along the perimeter thereof. The guide wall 55 thus formed on the plate 51 comprises a lower 55a and an upper 55b portion. The lower portion 55a extends vertically downwards until the first receiving vessel 3 is met. The upper portion 55b extends vertically upwards until its height is approximately equal to the depth of lower portion 55a. The lower and upper wall portions together form a vertical guide wall 55 extending through the center of the plate 51. At the bottom end of the lower portion 55a, a plurality of teeth 56 are formed so that liquid is allowed to pass through the apertures formed between the teeth 55 and reaches the hole 5. The apertures between the teeth 55 are usually smaller than that of the openings 54 on the plate 51, thereby providing also secondary filtering. Further, the teeth 56 also extend slightly radially inwards, forming a retaining means to prevent escape of the floating body 57 through the lower end of the wall.

Inside the cylindrical guide wall 55, there is provided a valve functioning floating body 57 having a bottom part with a sufficiently large area for closing the hole 5 when the liquid inside the first receiving vessel drops to a certain pre-defined level before the liquid in the vessel 3 is completely drained. The floating body 57 in the present embodiment is a hollow spherical ball which has a non-orientational surface geometry and has a diameter larger than that of the hole 5 to allow closure. It would be appreciated, however, that floating body 57 of other shapes, for example, bulbous, ellipsoidal or cylindrical, may also be used as long as a closure effect can be achieved. The floating body 57 is restrained inside the guide wall by means of a cap 58 having ventilating means 59 at the top by which means the liquid level inside and outside of the guide wall are substantially the same because of equalisation of air pressure inside and outside the guide wall 55. It should also be appreciated that the ventilation means can also b formed on the wall or edge of the cap. In normal operation, the first receiving vessel 3 is filled with an object liquid which passes through the filter plate 51, gets inside the guide wall 55 through the apertures between the teeth 56 and causes buoyancy of the floating body 57. The first vessel 3 remains substantially horizontal when the spoon is tilted sideways to release the filtered liquid and the liquid level inside the guide wall is lowered as liquid leaves the spoon through the pouring opening 7, thereby causing the level of the floating body 57 to drop. The hole 5 will be blocked or closed when the floating body 57 drops to a certain pre-defined level, thus preventing the unwanted components, for example fats or oils, which float on the surface of the top layer of liquid from leaving the first receiving vessel 3.

After each use, the filter plate 51 can easily be removed from the first receiving vessel 3 and dis-assembled to enable cleaning of the floating body 57, the cap 59 and the guide wall 55 separately and a hygienic condition can therefore be always maintained.

I claim:

1. Apparatus for separating a liquid from a floating component, the apparatus comprising:

a first liquid receiving vessel;

a second liquid receiving vessel;

a filter plate; and baffle walls, wherein said first liquid receiving vessel is received within and is mounted for rotation relative to said second receiving vessel, said first liquid receiving vessel has a hole at a base region thereof through which liquid received in said first receiving vessel in use may flow into said second liquid receiving vessel from which the liquid may then be poured, said filter plate covers said hole, and said baffle walls are provided in said first liquid receiving vessel to obstruct flow of the liquid to said hole and trap any unwanted component.

2. The apparatus as claimed in claim 1 wherein said filter plate includes an annular filter surrounding said hole and a solid region over said hole, and said baffle walls include a first annular wall extending downwardly from said filter plate and a second annular wall extending upwardly from said base region of said first liquid receiving vessel.

3. Apparatus for separating a liquid from a floating component, the apparatus comprising:

a first liquid receiving vessel;

a second liquid receiving vessel; and a filter plate, wherein said first liquid receiving vessel is received within and mounted for rotation relative to said second liquid receiving vessel, said first liquid receiving vessel has a hole at a base region thereof through which liquid received in said first liquid receiving vessel in use may flow into said second liquid receiving vessel from which the liquid may then be poured, and said filter plate overlies said hole and includes a projection extending downwardly to block said hole when the liquid in said first liquid receiving vessel is at a first liquid level.

4. Apparatus for separating a liquid from a floating component, the apparatus comprising:

a first liquid receiving vessel;

a second liquid receiving vessel; and a plug-like member, wherein said first liquid receiving vessel is received within and is mounted for rotation relative to said second liquid receiving vessel, said first liquid receiving vessel has a hole at a base region thereof through which liquid received in said first liquid receiving vessel in use may flow into said second liquid receiving vessel from which the liquid may then be poured; and said plug-like member is disposed over said hole, said plug-like member having a solid upper surface with an annular wall depending downwardly therefrom, said wall defining a narrow gap with said base region of said first liquid receiving vessel for liquid to pass through to said hole.

5. Apparatus for separating a liquid from a floating component, the apparatus comprising:

a first liquid receiving vessel;

a second liquid receiving vessel;

a floating body; and a filter plate, wherein said first liquid receiving vessel is received within and mounted for rotation relative to said second liquid receiving vessel, said first liquid receiving vessel has a hole at a base region thereof through which liquid received in said first liquid receiving vessel in use may flow into said second liquid receiving vessel from which the liquid may then be poured, said filter plate overlies said hole and includes a wall extending downwardly toward said base region of said first liquid receiving vessel to surround said hole, and said floating body is disposed within said wall to float in the liquid relative to said hole.

6. The apparatus as claimed in claim 5, wherein said wall has a lower end, and an aperture is formed between said lower end of said wall and said base portion of said first liquid receiving vessel.

7. The apparatus as claimed in claim 5, wherein said first liquid receiving vessel includes a liquid path near said lower end of said wall to allow liquid passage into said hole.

8. The apparatus as claimed in claim 5, further comprising:

ventilating means for substantially equalizing air-pressure inside and outside said wall, said ventilating means being disposed on said wall.

9. The apparatus as claimed in claim 8, further comprising a removable cap that is attachable to said wall.

10. The apparatus as claimed in claim 9, wherein said ventilating means is disposed on said removable cap.

11. A kitchen utensil for separating a liquid from an unwanted component of a mixture, the kitchen utensil comprising:

a first liquid receiving vessel having a hole;

a second liquid receiving vessel, the first liquid receiving vessel being disposed within and mounted for rotation relative to the second liquid receiving vessel such that liquid received in the first liquid receiving vessel is allowed to flow through the hole into the second liquid receiving vessel; and a filter disposed on the first liquid receiving vessel to obstruct the flow of liquid through the hole and trap an unwanted component of a mixture.

12. The kitchen utensil as recited in claim 11, wherein the second liquid receiving vessel includes a spout disposed on a top portion thereof such that liquid can be poured from the spout by tilting the second liquid receiving vessel.

13. The kitchen utensil as recited in claim 12, further comprising a handle attached to the second liquid receiving vessel.

14. The kitchen utensil as recited in claim 12, wherein the second liquid receiving vessel includes a trough extending from below the hole to the spout.

15. The kitchen utensil as recited in claim 12, wherein the second liquid receiving vessel includes a rib disposed along a top portion thereof, the rib extending inwardly over a portion of the first liquid receiving vessel.

16. The kitchen utensil as recited in claim 15, wherein the first liquid receiving vessel includes a flange along a top portion thereof, the flange extending outwardly to cover the spout.

17. The kitchen utensil as recited in claim 12, wherein the first liquid receiving vessel includes a flange along a top portion thereof, the flange extending outwardly to cover the spout.

18. The kitchen utensil as recited in claim 11, further comprising a handle attached to the second liquid receiving vessel.

19. The apparatus as claimed in claim 3, further comprising a handle attached to the second liquid receiving vessel.

20. The apparatus as claimed in claim 4, further comprising a handle attached to the second liquid receiving vessel.

* * * * *